(12) United States Patent  
Gandolph et al.

(10) Patent No.: US 9,971,951 B2
(45) Date of Patent: May 15, 2018

(54) METHOD AND APPARATUS FOR GENERATING SUPERPIXEL CLUSTERS

(71) Applicant: THOMSON LICENSING, Issy les Moulineaux (FR)

(72) Inventors: Dirk Gandolph, Ronnenberg (DE); Wolfram Putzke-Roeming, Hildesheim (DE); Andrej Schewzow, Hannover (DE)

(73) Assignee: THOMSON LICENSING, Issy les Moulineaux (FR)

( * ) Notice: Subject to any disclaimer, the term of this patent is extended or adjusted under 35 U.S.C. 154(b) by 29 days.

(21) Appl. No.: 15/026,706

(22) PCT Filed: Sep. 22, 2014

(86) PCT No.: PCT/EP2014/070139
§ 371 (c)(1),
(2) Date: Apr. 1, 2016

(87) PCT Pub. No.: WO2015/049118
PCT Pub. Date: Apr. 9, 2015

(65) Prior Publication Data
US 2016/0321517 A1 Nov. 3, 2016

(30) Foreign Application Priority Data
Oct. 2, 2013 (EP) ..................................... 13306363

(51) Int. Cl.
*G06K 9/34* (2006.01)
*G06K 9/46* (2006.01)
(Continued)

(52) U.S. Cl.
CPC ................ *G06K 9/46* (2013.01); *G06T 7/11* (2017.01); *G06T 7/187* (2017.01)

(58) Field of Classification Search
CPC ........... G06K 9/6218; G06T 7/10; G06T 7/11; G06T 7/12
See application file for complete search history.

(56) References Cited

U.S. PATENT DOCUMENTS

2012/0251003 A1 10/2012 Perbet et al.
2012/0275703 A1* 11/2012 Lv ......................... G06T 3/4053
382/173
(Continued)

FOREIGN PATENT DOCUMENTS

CN 102096816 12/2012
WO WO2012020211 2/2012

OTHER PUBLICATIONS

Anonymous, "Scene: Novel Scene representations for richer networked media", SIGGRAPH 2013, Anaheim, California, USA, Jun. 18, 2013, http://3d-scene.eu, pp. 1.
(Continued)

*Primary Examiner* — Eueng-Nan Yeh
(74) *Attorney, Agent, or Firm* — Tutunjian & Bitetto, P.C.

(57) ABSTRACT

Method and apparatus for generating superpixel clusters A method and an apparatus (20) for generating a superpixel cluster for an image are described. A clustering unit (23) generates (10) an initial superpixel cluster based on an initial cluster center. The clustering unit (23) further generates (12) one or more further superpixel clusters based on one or more further cluster centers. A determining unit (24) determines (11) the one or more further cluster centers from the initial superpixel cluster. A merger (25) then merges (13) the initial superpixel cluster and the one or more further superpixel clusters to obtain the superpixel cluster for the image.

18 Claims, 6 Drawing Sheets

(51) Int. Cl.
    *G06T 7/11*         (2017.01)
    *G06T 7/187*       (2017.01)

(56) References Cited

U.S. PATENT DOCUMENTS

| | | |
|---|---|---|
| 2013/0156305 A1 | 6/2013 | Prasad et al. |
| 2013/0163857 A1 | 6/2013 | Bronder et al. |
| 2013/0163874 A1 | 6/2013 | Shechtman et al. |
| 2013/0342559 A1* | 12/2013 | Reso .................. G09G 5/02 345/591 |

OTHER PUBLICATIONS

Achanta et al., "SLIC Superpixels Compared to State-of-the-Art Superpixel Methods", Journal of Latex Class Files, vol. 6, No. 1, Dec. 2011, pp. 1-8.

Ren et al., "gSLIC: a real-time implementation of SLIC superpixel", Technical Report University of Oxford, Department of Engineering Science, Jun. 28, 2011, pp. 1-6.

Fulkerson et al., "Class segmentation and object localization with superpixel neighborhoods", IEEE 2009 12 th International Conference on Computer Vision, Kyoto, Japan, Sep. 29, 2009, pp. 670-677.

* cited by examiner a) Iteration 1 b) Iteration 2 c) Iteration 3 a) α-cluster iteration 1 b) β₁-cluster iteration 1 c) β₁-cluster iteration 2

METHOD AND APPARATUS FOR GENERATING SUPERPIXEL CLUSTERS

This application claims the benefit, under 35 U.S.C. § 365 of International Application PCT/EP2014/070139, filed Sep. 22, 2014, which was published in accordance with PCT Article 21(2) on Apr. 9, 2015 in English and which claims the benefit of European patent application No. 13306363.6, filed Oct. 2, 2013.

FIELD OF THE INVENTION

The invention relates to a method and an apparatus for generating superpixel clusters for an image, and more specifically to a method and an apparatus for generating superpixel clusters using an improved and more significant color base and creating more consistent cluster shapes.

BACKGROUND OF THE INVENTION

Today there is a trend to create and deliver richer media experiences to consumers. In order to go beyond the ability of either sample based (video) or model-based (CGI) methods novel representations for digital media are required. One such media representation is SCENE media representation (http://3d-scene.eu). Therefore, tools need to be developed for the generation of such media representations, which provide the capturing of 3D video being seamlessly combined with CGI.

The SCENE media representation will allow the manipulation and delivery of SCENE media to either 2D or 3D platforms, in either linear or interactive form, by enhancing the whole chain of multidimensional media production. Special focus is on spatio-temporal consistent scene representations. The project also evaluates the possibilities for standardizing a SCENE Representation Architecture (SRA).

A fundamental tool used for establishing the SCENE media representation is the deployment of over-segmentation on video. See, for example, R. Achanta et al.: "*SLIC Superpixels Compared to State-of-the-Art Superpixel Methods*", IEEE Transactions on Pattern Analysis and Machine Intelligence, Vol. 43 (2012), pp. 2274-2282. The generated segments, also known as superpixels or patches, help to generate metadata representing a higher abstraction layer, which is beyond pure object detection. Subsequent processing steps applied to the generated superpixels allow the description of objects in the video scene and are thus closely linked to the model-based CGI representation.

A novel application evolving from the availability of superpixels is the generation of superpixel clusters by creating a higher abstraction layer representing a patch-based object description in the scene. The process for the superpixel cluster generation requires an analysis of different superpixel connectivity attributes. These attributes can be, for example, color similarity, depth/disparity similarity, and the temporal consistency of superpixels. The cluster generation usually is done semi-automatically, meaning that an operator selects a single initial superpixel in the scene to start with, while the cluster is generated automatically.

A well-known clustering method for image segmentation is based on color analysis. The color similarity of different picture areas is qualified with a color distance and is used to decide for a cluster inclusion or exclusion of a candidate area. A typical color distance measure compares the color histograms generated for each superpixel. However, for the color based clustering method the cluster growth and, therefore, the final superpixel cluster extent is highly dependent on the initially selected superpixel. The color data of the initially selected superpixel has the exclusive control on the clustering process, as all distance measures are related to it. Therefore, the resulting cluster shapes are highly dependent on the initially selected superpixel and show large variances.

Furthermore, the color based clustering has a tendency of providing a low significance inherent to the color information given with a single first selected superpixel. The color information available for the very first selected superpixel often does only roughly represent the required data. Thus the propagation of the superpixel cluster is accordingly limited and does often exclude relevant superpixels from becoming members of the cluster. However, a mitigation of the threshold controlling the cluster joining is not advisable, as it will not help to overcome the described weakness. A threshold mitigation does often lead to the problem that also unwanted superpixels are joined to the cluster.

SUMMARY OF THE INVENTION

It is thus an object of the present invention to propose an improved solution for generating superpixel clusters.

According to the invention, a method for generating a superpixel cluster for an image comprises:
  generating an initial superpixel cluster based on an initial cluster center;
  determining one or more further cluster centers from the initial superpixel cluster;
  generating one or more further superpixel clusters based on the one or more further cluster centers; and
  merging the initial superpixel cluster and the one or more further superpixel clusters to obtain the superpixel cluster for the image.

Accordingly, an apparatus configured to generate a superpixel cluster for an image comprises:
  a clustering unit configured to generate an initial superpixel cluster based on an initial cluster center and to generate one or more further superpixel clusters based on one or more further cluster centers;
  a determining unit configured to determine the one or more further cluster centers from the initial superpixel cluster; and
  a merger configured to merge the initial superpixel cluster and the one or more further superpixel clusters to obtain the superpixel cluster for the image.

Similarly, a computer readable storage medium has stored therein instructions enabling generating a superpixel cluster for an image, which when executed by a computer, cause the computer to:
  generate an initial superpixel cluster based on an initial cluster center;
  determine one or more further cluster centers from the initial superpixel cluster;
  generate one or more further superpixel clusters based on the one or more further cluster centers; and
  merge the initial superpixel cluster and the one or more further superpixel clusters to obtain the superpixel cluster for the image.

The proposed solution refines the initially generated superpixel cluster by broadening the color data base incorporated for the distance measures. This is realized by considering geometrical distances and color similarities with respect to the initially selected superpixel. The new superpixel cluster forming is reached by building the set union of previous independently generated superpixel clusters.

Known algorithms for color based superpixel clustering use a manually selected start area, i.e. a first selected superpixel, as a color base and compare it to the neighboring picture areas, i.e. neighboring superpixels. These algorithms compare cluster candidates using a color base of low significance, which leads to superpixel clusters that exclude relevant picture areas. The proposed solution overcomes this issue by providing a more significant color base for color distance measures. It thus sharpens the significance of a single selected superpixel by not excluding relevant superpixels from the resulting cluster.

Another problem encountered for the known solutions is the large difference between the resulting cluster shapes in dependence on the first selected superpixels. This means that the cluster shape calculated based on a first selected superpixel will completely differ from a cluster shape calculated based on a directly neighboring superpixel, even when both superpixels are part of both resulting clusters. This unpredictability makes an intuitive and correct selection difficult. The proposed solution generates more consistent cluster shapes, which are more independent from the first selected superpixel, and thus facilitates the intuitive selection of the first superpixel.

Yet another problem of the known algorithms is the high sensibility of the resulting clusters against changes made to the color distance threshold. The maximum allowed color distance must be chosen appropriately to create a meaningful abstraction. The proposed solution relaxes this sensibility and eases an appropriate threshold selection.

The approach of clustering superpixels can be transferred to other data than color information. Therefore, the disclosed idea is applicable to other image processing algorithms or statistical analysis performed to any kind of geometrical data.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

The proposed solution is optimized for over-segmented videos comprising non-overlapping superpixels. It improves the cluster generation starting with an initial selected superpixel. The solution is applicable to any centralistic cluster generation, which is controlled by the initial selection and propagating through adjacent superpixels by analyzing the features of the initial selected superpixel, e.g. color histograms, against the features of each superpixel that is a candidate for the cluster.

Figure 1:
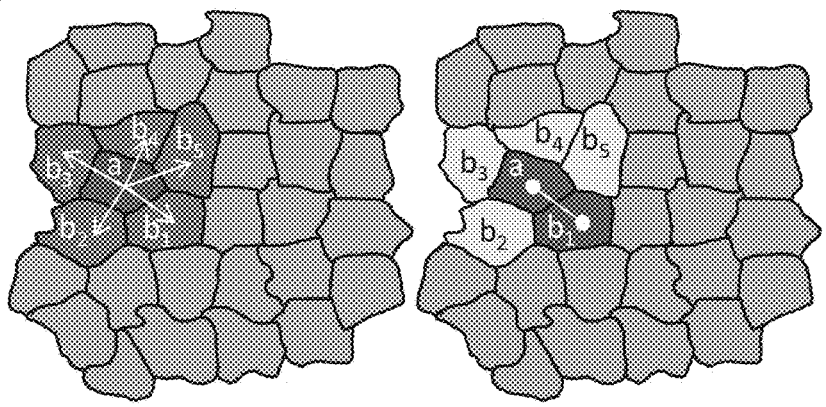
FIG. 1 schematically illustrates a typical superpixel cluster generation using three iterations, FIG. 2 schematically illustrates an approach for refined superpixel cluster generation.
Figure 1:
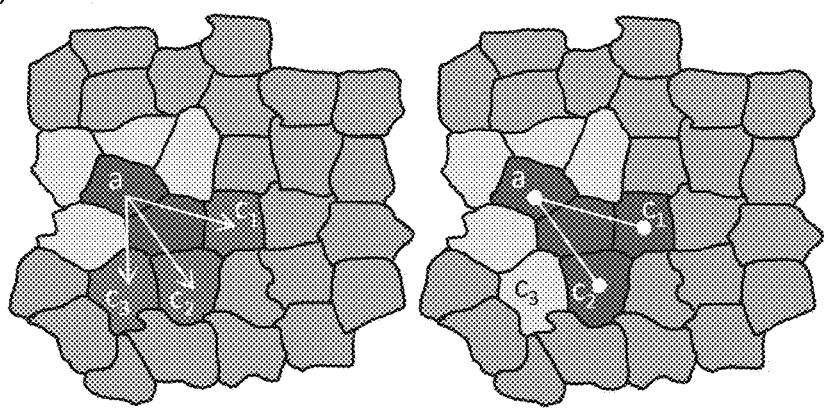
Figure 1:
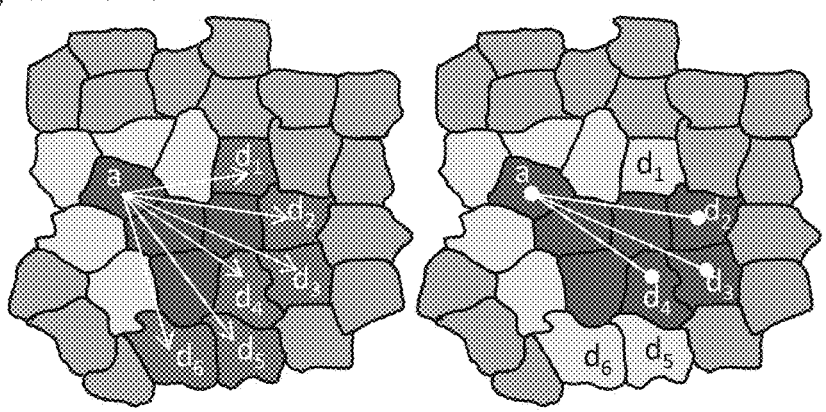

FIG. 1 shows the schematic of a typical centralistic cluster generation in three iterations. Of course, further iterations may be used. This approach is known as a single-path clustering. The first iteration starts with an initial selected superpixel a. The color histogram (feature) of a is compared against the color histograms of the adjacent superpixels $b_1$-$b_5$. The tested superpixels are indicated in medium dark grey. The decision about the cluster inclusion or exclusion is taken by means of a distance measure calculated from the color histograms associated to the superpixels. If, for example, the Chi-Square distance between the two color histograms exceeds a given threshold $\Delta$, a cluster membership is rejected. If the calculated distance measure is less than or equal to the threshold a cluster membership is accepted. In the first iteration in FIG. 1a) the superpixel $b_1$ fulfills the threshold condition and becomes a member of the cluster, while all other candidates $b_2$-$b_5$ are rejected. The rejected candidates are indicated in light grey. The resulting cluster comprising a and $b_1$, which is indicated in dark grey, is shown in the right part of FIG. 1a).

In the next iteration step shown in FIG. 1b) the new neighboring superpixels $c_1$-$c_3$ adjacent to the created interim cluster are analyzed. The distance measure is again calculated against the initial selected superpixel, which manifests the principle of a centralistic cluster building. In the second iteration the superpixels $c_1$ and $c_2$ pass the test for cluster membership, while the superpixel $c_3$ fails and is excluded. The resulting cluster comprising a, $b_1$, $c_1$, and $c_2$ is shown in the right part of FIG. 1b).

In the third iteration, which is depicted in FIG. 1c), the superpixels $d_1$-$d_6$ are the new neighbors adjacent to the interim cluster and thus are analyzed. In this iteration the superpixels $d_2$, $d_3$, and $d_4$ become members of the cluster, while the superpixels $d_1$, $d_5$, and $d_6$ are rejected. The iterations continue and will stop only in case that all superpixel candidates are rejected or in case that no more neighboring superpixels can be found. Again, the resulting cluster is depicted in the right part of FIG. 1c).

Figure 2:
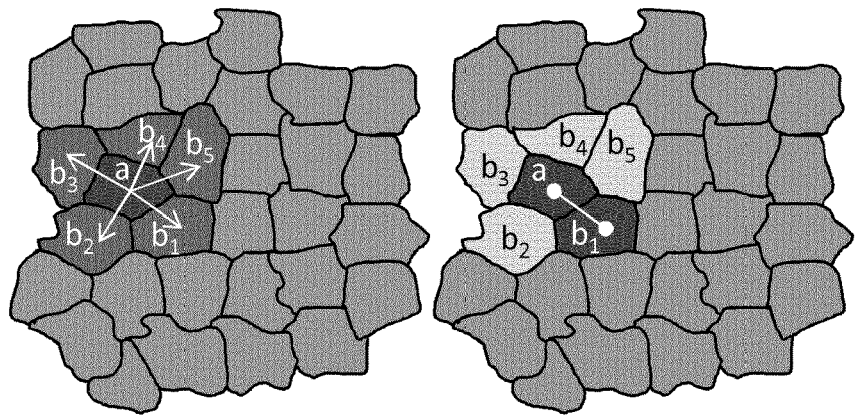
Figure 2:
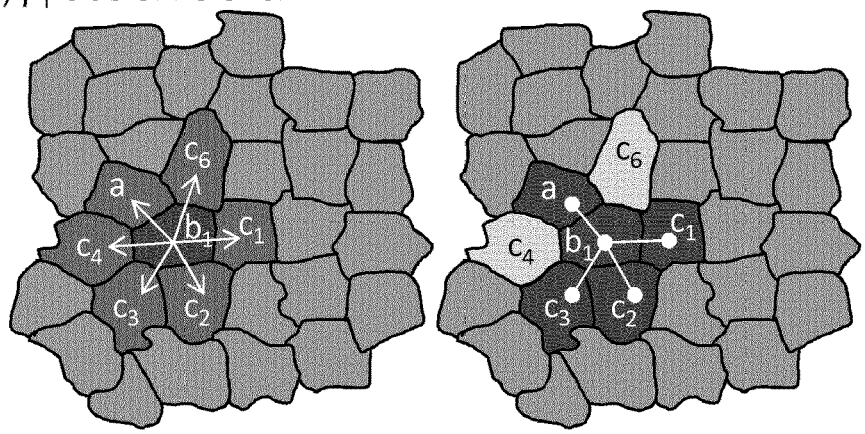
Figure 2:
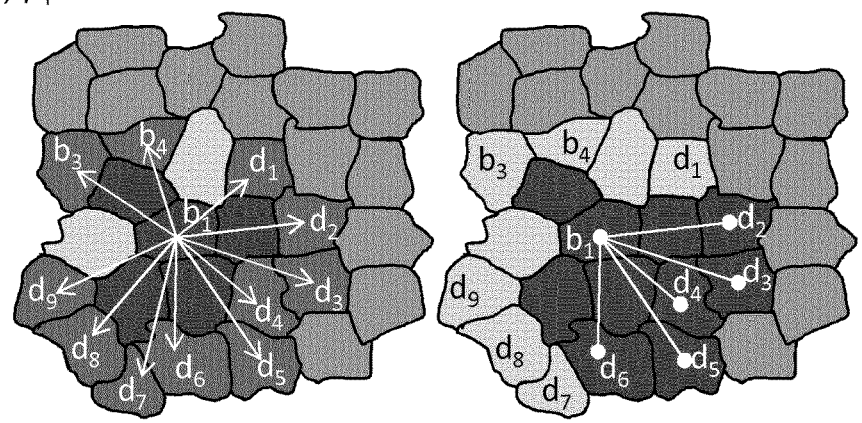
Figure 3:
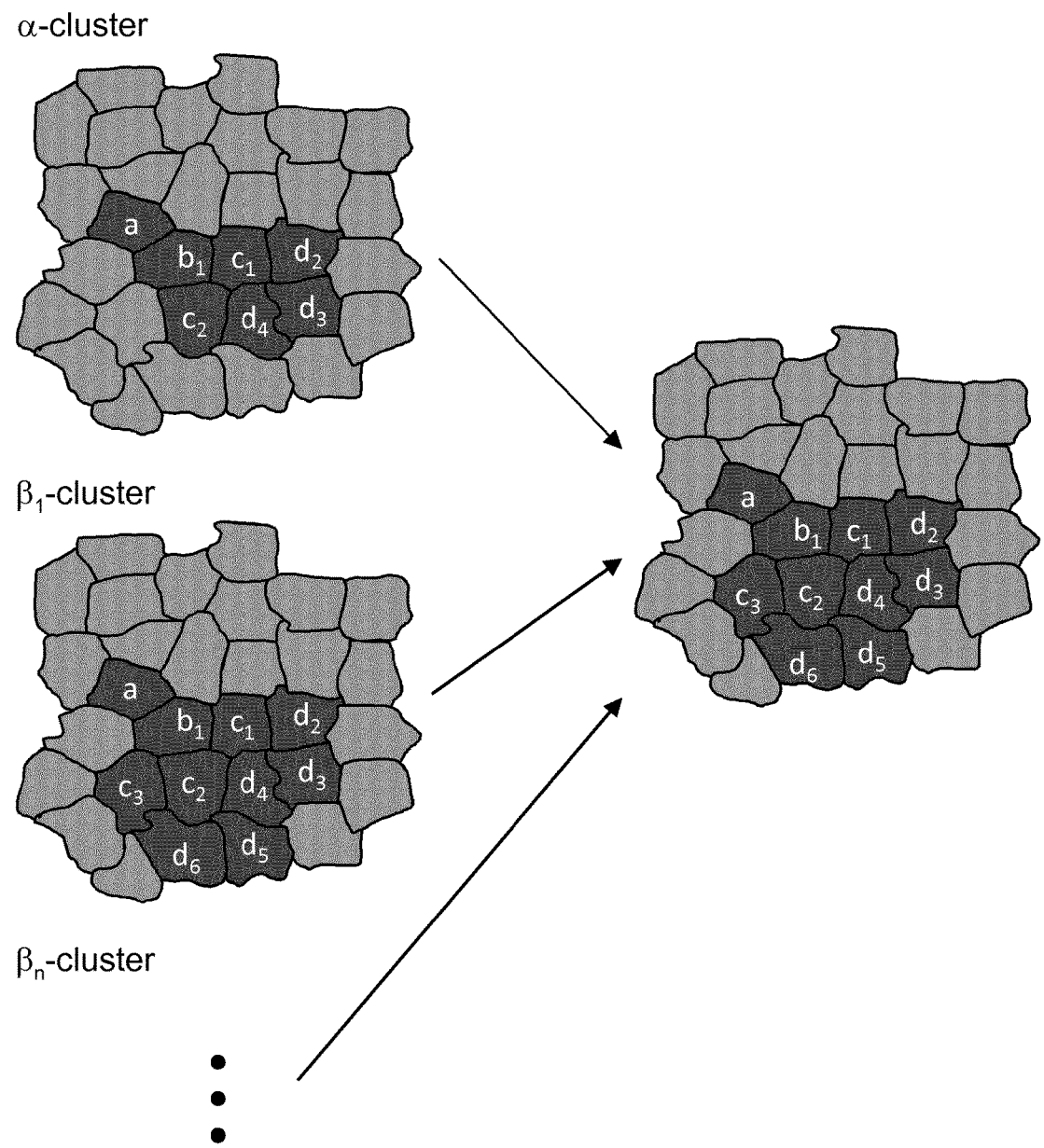
FIG. 3 depicts merging of different superpixel clusters generated during the refined superpixel cluster generation.

FIG. 2 and FIG. 3 describe the working principle of the proposed refined superpixel clustering. The refined superpixel clustering starts with the same cluster generation as described in FIG. 1a). In the following the resulting cluster is called an $\alpha$-cluster for being distinguishable from further steps. The $\alpha$-cluster specifies those superpixels for which a separate and independent centralistic cluster building is executed. In FIG. 2a) only the $\alpha$-cluster resulting from the first iteration is shown. Nonetheless, further iterations of this clustering are performed as discussed above with reference to FIG. 1. This single-path clustering is now refined using a multiple-path clustering. The result generated within the first iteration of the $\alpha$-clustering determines the superpixels for which an independent, so called $\beta$-clustering is carried out. Each superpixel joined to the $\alpha$-cluster in the first iteration initializes a $\beta_k$-clustering, where the index k of $\beta_k$ indicates the direct neighbors belonging to the center superpixel of the $\alpha$-cluster. Each $\beta_k$-cluster thus has a different reference superpixel. FIG. 2b) shows the first iteration for generating the $\beta_1$-cluster. The second iteration is depicted in FIG. 2c). For simplicity, potential further iterations are not shown. The center or reference of the $\beta_1$-cluster is superpixel $b_1$, as this superpixel is a direct neighbor of the center superpixel a during the α-clustering and is included in the resulting α-cluster. The procedure applied for the β-clustering is again the centralistic cluster building. The superpixel naming used for the iterations in FIGS. 2b) and c) is kept from the α-clustering to ease the comparison between α- and β-clustering.

As is apparent from FIGS. 2b) and c), the starting of the centralistic cluster building with $b_1$ generates a different superpixel cluster. The resulting $β_1$-cluster includes the superpixels $c_3$, $d_5$, and $d_6$, which during α-clustering were not included in the α-cluster. The β-clustering is executed only for those superpixels which are the direct neighbors of the α-clustering center superpixel and which also are member of the α-cluster. The advantage of the refined superpixel clustering is the consideration of geometrical distances and color similarities with respect to the initially selected superpixel. This leads to a broadening of the significance for the central superpixel feature.

The final step of the refined superpixel clustering is depicted in FIG. 3. Here the single α-cluster and all $β_k$-clusters are merged by forming a set union. The depicted example only indicates the principle and does not show the complete clusters. It should be noticed, however, that the new refined superpixel cluster includes the superpixels $c_3$, $d_5$, and $d_6$, which had being rejected before when only the single-path clustering was used.

Figure 4:
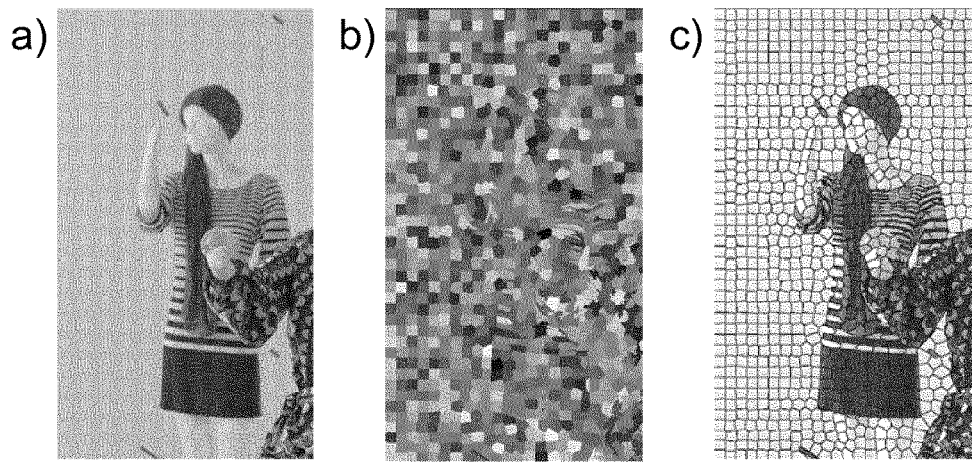
FIG. 4 shows an original image and two versions of superpixel structures generated for the image.

In the following the capabilities of the new approach shall be demonstrated by means of a practical example. FIGS. 4a) to c) show an original image and two versions of the superpixel structure generated for the image.

Figure 5:
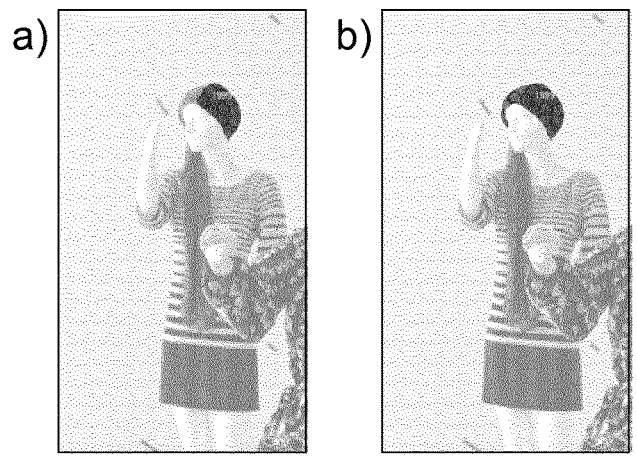
FIG. 5 depicts a first comparison of generated superpixel clusters.
Figure 6:
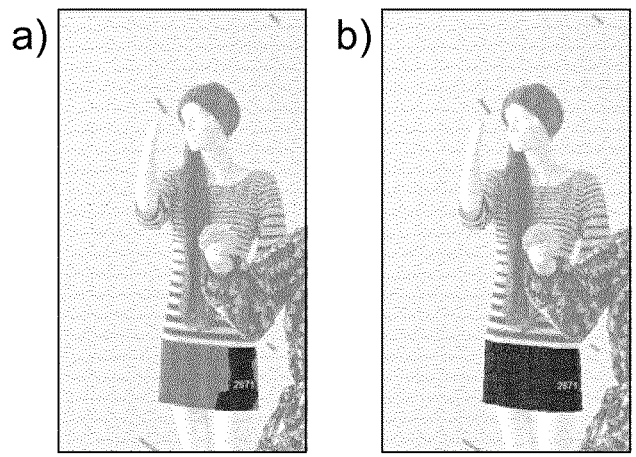
FIG. 6 shows a second first comparison of generated superpixel clusters.

FIG. 5 compares the superpixel clusters generated with the simple superpixel cluster algorithm (FIG. 5a)) against the refined superpixel cluster algorithm (FIG. 5b)) at the example of a cap of the depicted manikin. FIGS. 6a) and b) depict a similar comparison at the example of a skirt of the manikin. The numbers within the images are indexes belonging to the initial selected superpixels. From the cluster shapes generated for the cap and the skirt it is apparent that the refined superpixel cluster algorithm covers complete objects, whereas the simple clustering does only cover parts of them. This is remarkable as the image used shows a strong contrast, which should make it much easier to find the object borders in the scene.

Figure 7:
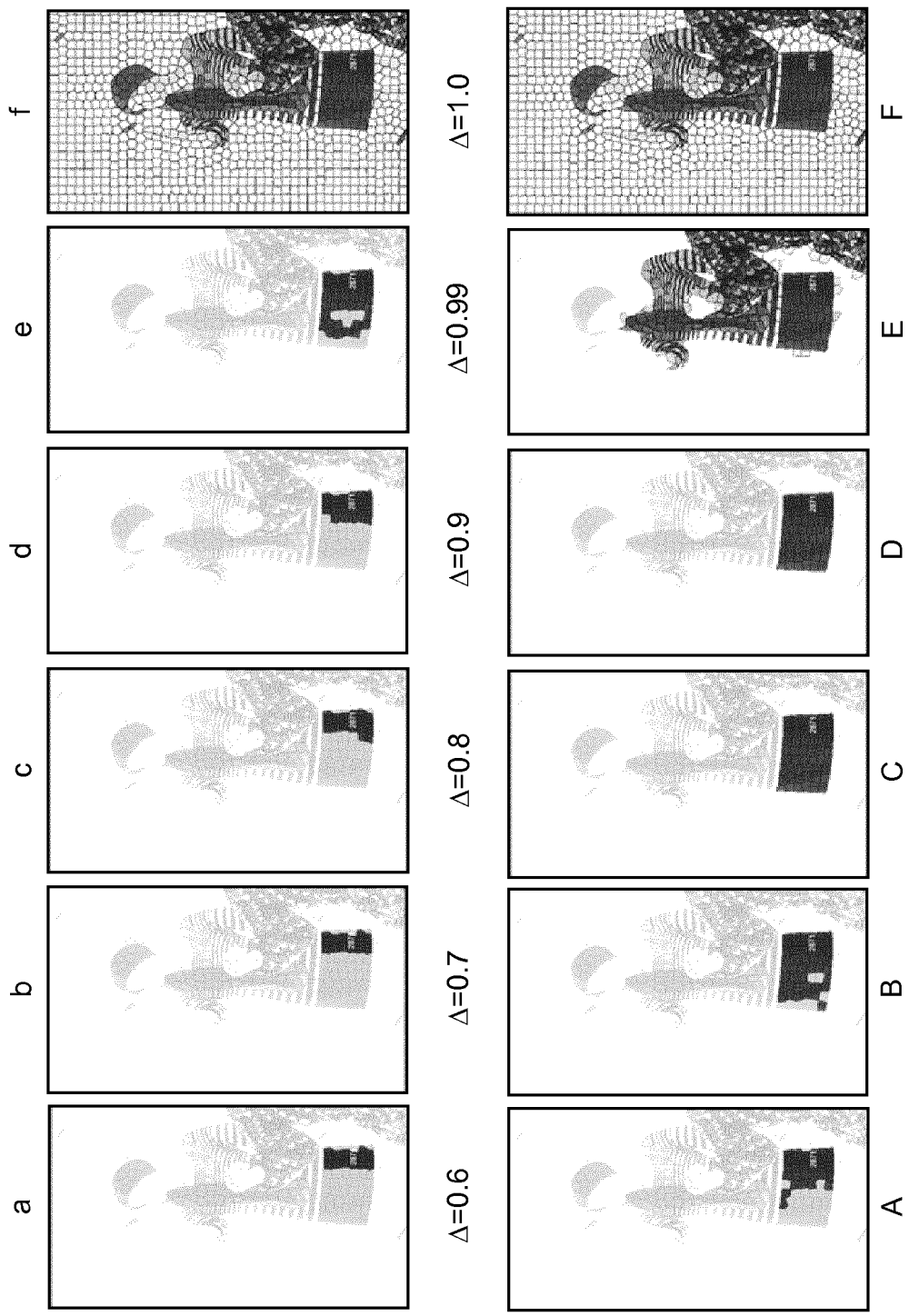
FIG. 7 illustrates how the threshold $\Delta$ influences the cluster generation, FIG. 8 schematically shows a method according to the invention for generating superpixel clusters.

FIG. 7 examines in more detail how the threshold Δ influences the cluster generation. The top row shows exemplary clustering results obtained with the simple clustering approach, whereas the bottom row reshows the clustering results for the refined superpixel cluster algorithm. Apparently a mitigation of the threshold Δ does not help to cover the skirt object in the scene when applying the simple superpixel cluster algorithm.

It can be seen from images a-f of the top row that increasing the threshold Δ has the effect that more superpixel join the cluster, because failing the test becomes more difficult. The increase of Δ is similar to an increase of the tolerance for joining the cluster. However, the difficulty to choose the right threshold Δ becomes visible in the transition from image e to image f, where the threshold is changed by 0.001 only. While for the threshold Δ=0.99 the simple superpixel cluster algorithm is unable to cover the whole skirt, a threshold change to Δ=1.0 breaks down all barriers.

Quite a different behavior is visible for the refined superpixel clustering results depicted in the bottom row of FIG. 7. The images A-F show also clusters generated with the same threshold changes as above. However, the outcome is much smoother and more predictable. While in the range of 0.8 to 0.9 the skirt is covered completely, any reduction or increase in the coverage is quite moderate. Also the transition between the images E and F shows reasonable cluster changes. This demonstrates the smoothing effect for the threshold reached by the proposed approach, which eases the appropriate threshold selection.

Figure 8:
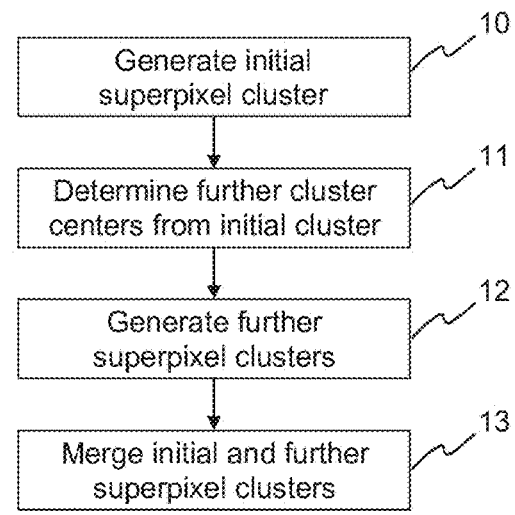

A method according to the invention for generating a superpixel cluster for an image is schematically shown in FIG. 8. In a first step an initial superpixel cluster is generated 10 based on an initial cluster center. Then one or more further cluster centers are determined 11 from the initial superpixel cluster. These one or more further cluster centers are used for generating 12 one or more further superpixel clusters. Finally, the initial superpixel cluster and the one or more further superpixel clusters are merged 13 to obtain the superpixel cluster for the image. It is likewise possible to change the order of the determination 11 of further cluster centers and the generation 12 of further superpixel clusters. In this case first all potential further superpixel clusters are generated in parallel. Then the generated superpixel clusters are limited to the relevant superpixel clusters, i.e. those stemming from the determined further cluster centers.

Figure 9:
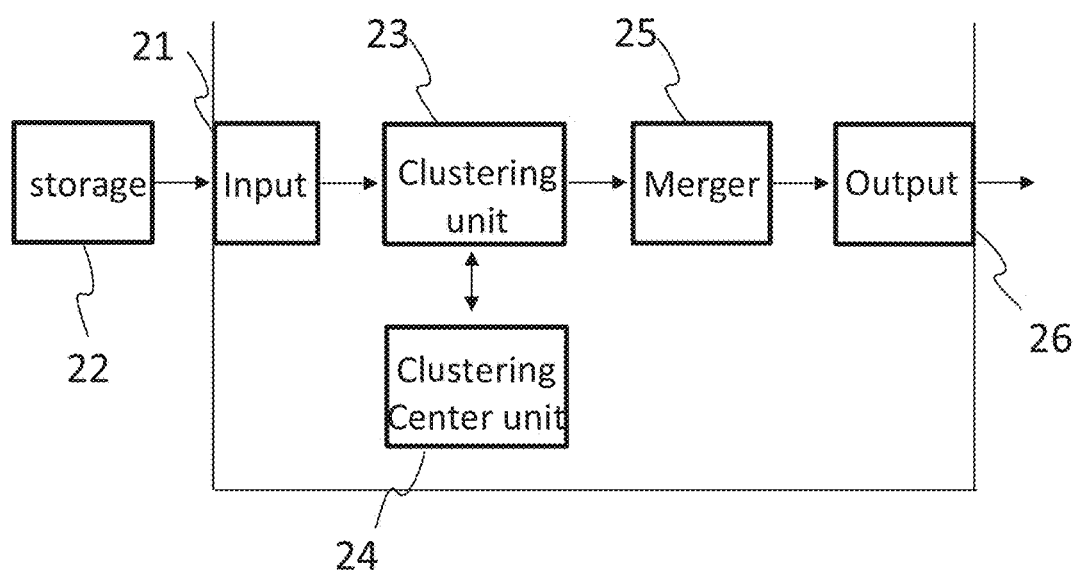
FIG. 9 illustrates an apparatus adapted to implement a solution according to the invention for generating superpixel clusters.

FIG. 9 schematically illustrates an apparatus 20 adapted to implement a solution according to the invention for generating a superpixel cluster for an image. The apparatus has an input 21 for receiving the image and the superpixels for the image, e.g. from a network or a local storage 22. Of course, the superpixels for the image may likewise be generated by dedicated circuitry (not shown) within the apparatus 20. A clustering unit 23 generates 10 an initial superpixel cluster based on an initial cluster center. A cluster center determining unit 24 then determines 11 one or more further cluster centers from the initial superpixel cluster. The clustering unit 23 uses these one or more further cluster centers for generating 12 one or more further superpixel clusters. Of course, also a dedicated further clustering unit may be provided for this purpose. A merger 25 then merges 13 the initial superpixel cluster and the one or more further superpixel clusters to obtain the superpixel cluster for the image. The resulting superpixel cluster is preferably made available for further processing via an output 26. Of course, the different units 23, 24, 25 may likewise be fully or partially combined into a single unit or implemented as software running on a processor. In addition, the input 21 and the output 26 may likewise be combined or partially combined into a single bi-directional interface.

The invention claimed is:

1. A method for generating a superpixel cluster for an image, the method comprising:
   generating an initial cluster of superpixels from an initial cluster center;
   determining, within said initial cluster, one or more further cluster centers different from said initial cluster center;
   generating one or more further clusters of superpixels from the one or more further cluster centers; and
   grouping the superpixels of the initial cluster with the superpixels of the one or more further superpixel clusters to obtain the superpixel cluster for the image.

2. The method according to claim 1, wherein the initial cluster and the one or more further clusters are generated using a centralistic cluster building approach.

3. The method according to claim 2, wherein the initial cluster is generated by comparing connectivity attributes of an initial superpixel comprising said initial cluster center with connectivity attributes of superpixels adjacent to said initial superpixel and the one or more further clusters are generated by comparing connectivity attributes of further superpixels comprising said further cluster centers with connectivity attributes of superpixels adjacent to said further superpixels.

4. The method according to claim 3, wherein the connectivity attributes are color histograms.

5. The method according to claim 3, wherein a decision on the cluster inclusion or exclusion of a superpixel is taken by means of a distance measure calculated between the connectivity attributes associated with said superpixel and the connectivity attributes associated with the superpixel comprising the center of said cluster.

6. The method according to claim 5, wherein a superpixel is excluded from a cluster if the distance measure exceeds a threshold.

7. An apparatus configured to generate a superpixel cluster for an image, the apparatus comprising a processor configured to:
generate an initial cluster of superpixels from an initial cluster center;
determine, within said initial cluster, one or more further cluster centers different from said initial cluster center;
generate one or more further clusters of superpixels from the one or more further cluster centers; and
group the superpixels of the initial cluster with the superpixels of the one or more further superpixel clusters to obtain the superpixel cluster for the image.

8. The apparatus according to claim 7, wherein processor is configured to generate the initial cluster and the one or more further clusters using a centralistic cluster building approach.

9. The apparatus according to claim 8, wherein the processor is further configured to generate the initial cluster by comparing connectivity attributes of an initial superpixel comprising said initial cluster center with connectivity attributes of superpixels adjacent to said initial superpixel and to generate the one or more further clusters by comparing connectivity attributes of further superpixels comprising said further cluster centers with connectivity attributes of superpixels adjacent to said further superpixels.

10. The apparatus according to claim 9, wherein the connectivity attributes are color histograms.

11. The apparatus according to claim 9, wherein said processor is configured to take a decision on the cluster inclusion or exclusion of a superpixel by means of a distance measure calculated between the connectivity attributes associated with said superpixel and the connectivity attributes associated with the superpixel comprising the center of said cluster.

12. The apparatus according to claim 11, wherein said processor is configured to exclude a superpixel from a cluster if the distance measure exceeds a threshold.

13. A non-transitory computer readable storage medium having stored therein instructions enabling generating a superpixel cluster for an image, which, when executed by a computer, cause the computer to:
generate an initial cluster of superpixels from an initial cluster center;
determine, within said initial cluster, one or more further cluster centers different from the initial cluster center;
generate one or more further clusters of superpixels from the one or more further cluster centers; and
group the superpixels of the initial cluster with the superpixels of the one or more further superpixel clusters to obtain the superpixel cluster for the image.

14. The non-transitory computer readable storage medium according to claim 13, wherein the instructions cause the computer to generate the initial superpixel cluster and the one or more further superpixel clusters using a centralistic cluster building approach.

15. The non-transitory computer readable storage medium according to claim 14, wherein the instructions cause the computer to generate the initial cluster by comparing connectivity attributes of an initial superpixel comprising said initial cluster center with connectivity attributes of superpixels adjacent to said initial superpixel and to generate the one or more further clusters by comparing connectivity attributes of further superpixels comprising said further cluster centers with connectivity attributes of adjacent superpixels adjacent to said further superpixels.

16. The non-transitory computer readable storage medium according to claim 15, wherein the connectivity attributes are color histograms.

17. The non-transitory computer readable storage medium according to claim 15, wherein the instructions cause the computer to take a decision on the cluster inclusion or exclusion of a superpixel by means of a distance measure calculated between the connectivity attributes associated with said superpixel and the connectivity attributes associated with the superpixel comprising the center of said cluster.

18. The non-transitory computer readable storage medium according to claim 17, wherein the instructions cause the computer to exclude a superpixel from a cluster if the distance measure exceeds a threshold.

* * * * *